United States Patent
Bills

(10) Patent No.: US 6,366,319 B1
(45) Date of Patent: Apr. 2, 2002

(54) SUBTRACTIVE COLOR PROCESSING SYSTEM FOR DIGITAL IMAGING

(75) Inventor: Richard Bills, Wayne, NJ (US)

(73) Assignee: Photronics Corp., Oakland, NJ (US)

( * ) Notice: Subject to any disclaimer, the term of this patent is extended or adjusted under 35 U.S.C. 154(b) by 0 days.

(21) Appl. No.: 08/888,007

(22) Filed: Jul. 3, 1997

(51) Int. Cl.[7] .................................................. H04N 3/14
(52) U.S. Cl. ...................................... 348/273; 348/272
(58) Field of Search ................................ 348/273, 275, 348/280, 266, 268, 222, 230, 267, 264, 211; 382/162, 166; 358/426, 505, 539; 250/208.1

(56) References Cited

U.S. PATENT DOCUMENTS

| | | | |
|---|---|---|---|
| 4,654,484 A | * 3/1987 | Reiffel et al. | 348/14.13 |
| 4,764,805 A | * 8/1988 | Rabbani et al. | 375/240.01 |
| 4,775,885 A | * 10/1988 | Sato et al. | 348/280 |
| 5,050,230 A | * 9/1991 | Jones et al. | 382/166 |
| 5,402,170 A | * 3/1995 | Parulski et al. | 348/211 |
| 5,402,171 A | * 3/1995 | Tagami et al. | 348/279 |
| 5,541,653 A | * 7/1996 | Peters et al. | 348/264 |
| 5,949,064 A | * 9/1999 | Chow et al. | 348/222 |
| 6,115,556 A | * 9/2000 | Reddington | 348/64 |

* cited by examiner

*Primary Examiner*—Wendy R. Garber
*Assistant Examiner*—Aung S. Moe
(74) *Attorney, Agent, or Firm*—Cobrin & Gittes

(57) ABSTRACT

Improved methods and apparatus for digital focal plane array (FPA)—based color imaging include the step of sampling an image, using an FPA camera equipped with a color filter array (CFA) to obtain a value at each pixel position, thereby creating a set of values sampled on a per-pixel basis. Single-color cyan, yellow and white (CYW) color planes are generated from the set of sampled pixel values. Interpolates among and between the color plane values is executed to "fill in" the "gaps" in the individual color planes, and the interpolated CYW values from the single-color planes are transformed into RGB values which can be stored, transmitted, or utilized to drive a conventional video monitor or color printing device. Filtering and other post-interpolation steps are executed to reduce color aliasing, and the white plane is used to introduce high frequency content back into the filtered color image. In one practice of the invention, the CYW values are transformed into CIELAB color space values. The interpolated W plane is used to calculate $L^*$ values, and C, Y, and W planes are used to calculate $a^*$ and $b^*$ values. The $a^*$ and $b^*$ planes are filtered using a window with weighting coefficients, and the CIELAB color space values are then transformed to red, green, and blue color planes using a color look-up table (LUT). In this case, the luminance of each pixel is directly related to the W plane value at that pixel location.

34 Claims, 12 Drawing Sheets

(A) SUBTRACTIVE COLOR FILTER TRANSMISSION

DASHED CURVE = CYAN FILTER, SOLID CURVE = YELLOW FILTER (B) ADDITIVE COLOR FILTER TRANSMISSION

DASHED CURVE = BLUE FILTER, CENTER CURVE = GREEN FILTER, CURVE TO RIGHT = RED FILTER

| Y | W | Y | W | Y | W | Y | W |
|---|---|---|---|---|---|---|---|
| W | C | W | C | W | C | W | C |
| Y | W | Y | W | Y | W | Y | W |
| W | C | W | C | W | C | W | C |
| Y | W | Y | W | Y | W | Y | W |
| W | C | W | C | W | C | W | C |
| Y | W | Y | W | Y | W | Y | W |
| W | C | W | C | W | C | W | C |

SUBTRACTIVE COLOR PROCESSING SYSTEM FOR DIGITAL IMAGING

BACKGROUND OF THE INVENTION

The present invention relates generally to systems for digital color imaging, and, more particularly, relates to apparatus and methods for providing efficient color processing capability for digital video cameras based on focal plane arrays (FPA). The invention can be used in digital camera systems that are designed to replace conventional silver halide film cameras.

Many high speed motion events are filmed with high speed 16 mm film cameras for motion analysis and diagnostics. Typical frame rates for these cameras range from 500 to 1000 frames per second, and the shutter exposure times are usually less than 500 microseconds. Typical high speed events include airborne weapons separation testing, missile tracking, automotive and aerospace crash testing, manufacturing operations analysis, and others.

Silver halide film, however, requires time-consuming wet chemical processing and handling. Consequently, considerable time elapses before the image results are available for analysis. In addition, film processing requires the use of chemicals requiring storage and disposal. This chemically-intensive process adds to the overall cost of film-based systems.

Further, the film must be optically scanned with a film scanner to convert the image sequence to digital form for computer-aided motion analysis. This extra step can be unacceptably time-consuming.

High speed digital video camera systems have been developed to replace conventional silver halide film cameras. These cameras produce images in digital form that can be stored on digital media (e.g. hard disk, magnetic tape, compact disk, etc.) and analyzed on a computer. These systems provide immediate access to image data, thereby circumventing time-consuming film processing steps.

Conventional high speed digital camera systems are based on FPAs, such as charge-coupled devices (CCDs), which sense broadband visible radiation in the 400–730 nanometer wavelength range. Although monochrome performance can be satisfactory for certain applications, color capability is required for several reasons.

For example, although monochrome digital cameras are suitable for high speed motion analysis of targets that exhibit significant luminance contrast, they cannot distinguish different color objects having similar luminance characteristics.

Color sensing capability can also provide the contrast necessary to distinguish key features in an image, even under low illumination conditions. A color camera thus provides important target tracking and identification capabilities.

For example, identification of different components or fragments can be difficult when using monochrome cameras for impact testing or weapon release testing. By color coding the object(s) under test or using existing color differences, color cameras can be used to readily identify the source of fragments or components during the course of the test.

Further, qualitative evaluation of monochrome video sequences by human observers can be difficult because natural color cues are absent. Routine subjective evaluation of images from color cameras can be performed more efficiently because color images provide human observers with a more realistic reproduction of the test scene. Color cameras also enable interpretation of physical phenomena, such as plasma plume temperatures, during weapons deployment.

Accordingly, many tests and applications which can be undertaken with the use of full color images may be difficult or impossible with black and white images.

Nearly all digital color FPA cameras are based on the principle of color pre-filtering. Since FPAs sense radiation throughout the visible spectrum (400–700 nm), optical color filters must be placed in front of the FPA to sense color. There are several methods for accomplishing this: multiple FPA systems, color filter wheels, and color filter array (CFA) single-chip FPAs.

Multiple FPA configurations have been developed for high-end color FPA cameras. Although these cameras produce images with minimal artifacts and low noise, they are costly and bulky compared to cameras based on a single FPA. In addition, multiple FPA cameras generate as much as three times the amount of data produced by a monochrome camera, thus placing excessive data handling demands on the image storage hardware.

Certain single-chip FPA color cameras utilize a rotating color filter wheel. These cameras cannot be shuttered at high frame rates, due to FPA readout and filter wheel rotation rate limitations. Consequently, this method is substantially limited to still frame applications, and is not suitable for high speed camera applications.

A number of conventional FPA video camera systems provide color sensitivity by means of color filter arrays (CFAS) placed in front of, or deposited directly on, a single-chip FPA. "Additive" CFA/FPA combinations, utilizing red, green, and blue (RGB) filter "mosaics," have been in common use since the mid-1970's. These mosaics attempt to match the wavelength-dependent sensitivity of the human eye by including a larger percentage of green pixels than red and blue pixels.

By way of example, reference is made to the following U.S. and European Patent Office patents and other publications, the teachings of which are incorporated herein by reference:

| | |
|---|---|
| 4,282,547 | Morishita |
| 4,403,247 | Sone et al. |
| 4,646,139 | Takei et al. |
| 4,714,955 | Nishimura et al. |
| 4,716,455 | Ozawa et al. |
| 4,939,573 | Teranishi et al. |
| 5,008,739 | D'Luna et al. |
| 5,373,322 | Laroche et al. |
| 5,382,976 | Hibbard |
| 5,521,640 | Prater |
| 4,479,143 | Watanabe et al |
| 4,710,804 | Ide |
| 5,172,227 | Tsai et al |
| 3,971,065 | Bayer |
| 4,591,900 | Heeb et al |
| 4,125,856 | Netravali et al |
| 4,775,885 | Sato et al |
| 4,477,832 | Takemura |
| 4,513,312 | Takemura |
| 5,136,370 | Chi |
| 4,450,475 | Ishikawa et al. |
| 4,794,448 | Takizawa |
| 5,276,508 | Boisvert et al. |
| 5,235,412 | Boisvert et al. |
| 5,414,465 | Kodama et al. |
| 4,774,565 | Freeman |
| 4,642,678 | Cok |

-continued

| | |
|---|---|
| 4,176,373 | Dillon et al. |
| 5,032,910 | Cok |
| 5,065,229 | Tsai et al. |
| 5,053,861 | Tsai et al. |
| 5,398,086 | Martinez-Uriegas et al. |
| 5,541,653 | Peters et al. |
| EP 732859 | |
| EP 211320 | |

"Enabling Technologies for a Family of Digital Cameras", Parulski and Jameson, SPIE Vol. 2654, pp. 156–163, 1996;

"Single-Chip Color Camera Using a Frame-Transfer CCD", Aschwanden, Gale, Kieffer, Knop; *IEEE Transactions on Electron Devices*, Vol. ED-32, No. 8, August 1985, pp. 1396–1491;

"A New Class of Mosaic Color Encoding Patterns for Single-Chip Cameras"; Knop and Morf; *IEEE Transactions on Electron Devices*, Vol. ED-32, No. 8, August 1985, p. 1390–1395;

"Color Filters and Processing Alternatives for One-Chip Cameras"; Parulski; *IEEE Transactions on Electron Devices*, Vol. ED-32, No. 8, August 1985, pp. 1381–1389;

"Color Image Compression for Single-Chip Cameras"; Tsai; *IEEE Transactions on Electron Devices*, Vol. 38, No. 5, May 1991, pp. 1226–1232;

"Color Imaging System Using a Single CCD Array"; Dillon, Lewis, Kaspar; *IEEE Transactions on Electron Devices*, Vol. ED-25, No. 2, February 1978, pp. 102–107;

Hunt, R. W. G., *Measuring Colour*, Ellis Horwood Limited, 1995.

In systems using conventional, additive CFA/FPA devices, before the user can view the captured images in color, the image data must be "decoded." In the decoding process, mathematical interpolations are executed to recreate three full-resolution color "planes" (the red, green and blue (RGB) planes common to conventional, additive CFA systems) from the original image. A number of color decoding schemes have been developed to recreate the full RGB color planes from an RGB CFA plane. These processing methods are employed in some still-frame point-and-shoot color CCD cameras and 35 millimeter digital camera back products.

However, conventional "additive" CFA imaging systems using RGB sampling and processing suffer from significantly reduced light sensitivity, compared to monochrome FPA imaging systems. The sensitivity of a conventional RGB single-chip color FPA camera is significantly less than its monochrome counterpart due to absorption of light in the red, green and blue elements of the CFA. By way of example, the transmission efficiencies of conventional red, green, and blue filters (assuming tungsten-halogen lamp incident illumination) are 50%, 15% and 15%, respectively. Sensitivity is typically not a critical issue for still-frame cameras, because the corresponding exposure times are relatively long (on the order of 5 milliseconds). However, it is an important design issue for high speed cameras, because the exposure times are relatively short (less than 1 millisecond). Further, as the illumination on the pixels is reduced, the effect of noise becomes more significant. For these reasons, RGB "additive" CFAs are not suitable for operation under low-luminance conditions, particularly for high-speed cameras.

Accordingly, there exists a need for digital color imaging systems with improved sensitivity, capable of capturing high-speed motion events under less-than-optimal illumination conditions for subsequent review and/or analysis.

It is accordingly an object of the invention to provide improved digital color imaging methods and apparatus affording efficient color processing capability for digital FPA cameras.

Another object of the invention is to provide the capability of adding efficient color imaging and signal processing to existing FPA camera devices with only minor modifications to the camera system.

A further object of the invention is to provide such methods and apparatus having increased computational efficiency and speed, while maintaining high sensitivity to light, limited color aliasing, and enhanced chromatic and spatial reproduction quality.

Still another object is to provide color imaging and processing without significant increases in data throughput rates and interim storage requirements as compared with current monochrome CCD-based imaging systems.

Other objectives include the provision of high overall performance in a single-chip FPA/CFA system, and the maintenance of high spatial resolution and signal/noise ratios (SNR) when compared with monochrome imaging systems.

The invention is also intended to enable simplified fabrication of FPA/CFA combinations; simplified hardware requirements for full color reconstruction; and rapid, simplified reconstruction requirements for black and white imaging when desired.

Other general and specific objects of the invention will appear hereinafter.

SUMMARY OF THE INVENTION

The foregoing objects are attained by the invention, which provides improved FPA color imaging systems and processing methods.

One practice of the invention involves the step of sampling an image, using an FPA camera equipped with a cyan, yellow and white (CYW) color filter array (CFA) to obtain a value for a given color at each pixel position, thereby creating a set of values sampled on a per-pixel basis—i.e., a compressed dataset representing the color image. The set of pixel values thus sampled has, for each pixel position in the CFA/FPA, a single sampled value, corresponding to the color sampled by the CFA/FPA at that pixel position. The data compression inherent in this method results from the fact that the set of sampled pixel values contains, for each pixel position, only one "color value," rather than three.

In accordance with this practice of the invention, single-color cyan, yellow and white (CYW) color planes are generated from the set of sampled pixel values. A interpolating digital image signal processor then interpolates among and between the color planes to "fill in" the "gaps" in the individual color planes. The signal processor then transforms the interpolated CYW values from the single-color planes into RGB values which can be stored, transmitted, or utilized to drive a conventional video monitor or color printing device.

In accordance with a further practice of the invention, the interpolating processor executes a series of weighted summation steps that incorporate the sampled value at each pixel, as well as the values of the pixels surrounding the pixel to be interpolated.

In a further practice of the invention, the signal processor executes filtering and other post-interpolation steps to reduce color aliasing. The RGB color values at each pixel are then calculated from these filtered color planes. In particular, the processor can utilize a square "window" with weighting coefficients to filter the interpolated C,Y,W color planes before color is estimated, thereby reducing the spatial bandwidth of these planes. Then, after the C, Y, and W planes are filtered, a color look-up table (LUT) is used to determine the corresponding red, green, and blue values at each pixel location.

In a further preferred practice of the invention, since the white plane is an accurate representation of a monochrome luminance image, the white plane is used to introduce the high frequency content back into the filtered color image. This is accomplished by multiplying each pixel in the fully-generated red, green and blue planes by the white plane value, normalized by a linear combination of the red, green and blue values at that pixel position. The luminance at each pixel is thereby adjusted so that it is equal to that of the white plane value at that location.

In a further preferred practice of the invention, the signal processor utilizes a color LUT to transform the CYW values to RGB values. The RGB planes are subsequently spatially filtered before white plane multiplication.

In yet a further preferred practice of the invention, the signal processor transforms the CYW values to CIELAB color space values. The interpolated W plane is used to calculate $L^*$ values, and C, Y, and W planes are used to calculate $a^*$ and $b^*$ values. The $a^*$ and $b^*$ planes are filtered using a window with weighting coefficients, and the CIELAB color space values are then transformed to red, green, and blue color planes using a color look-up table (LUT). In this case, the luminance of each pixel is directly related to the W plane value at that pixel location.

The invention further encompasses software and hardware for executing these process steps, as disclosed hereinafter.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which:

FIG. 4A is a schematic diagram showing a preferred CYW CFA composed of 50% white (W) pixels, 25% cyan (C) pixels, and 25% yellow (Y) pixels.

DESCRIPTION OF ILLUSTRATED EMBODIMENTS

System Overview

Figure 1:
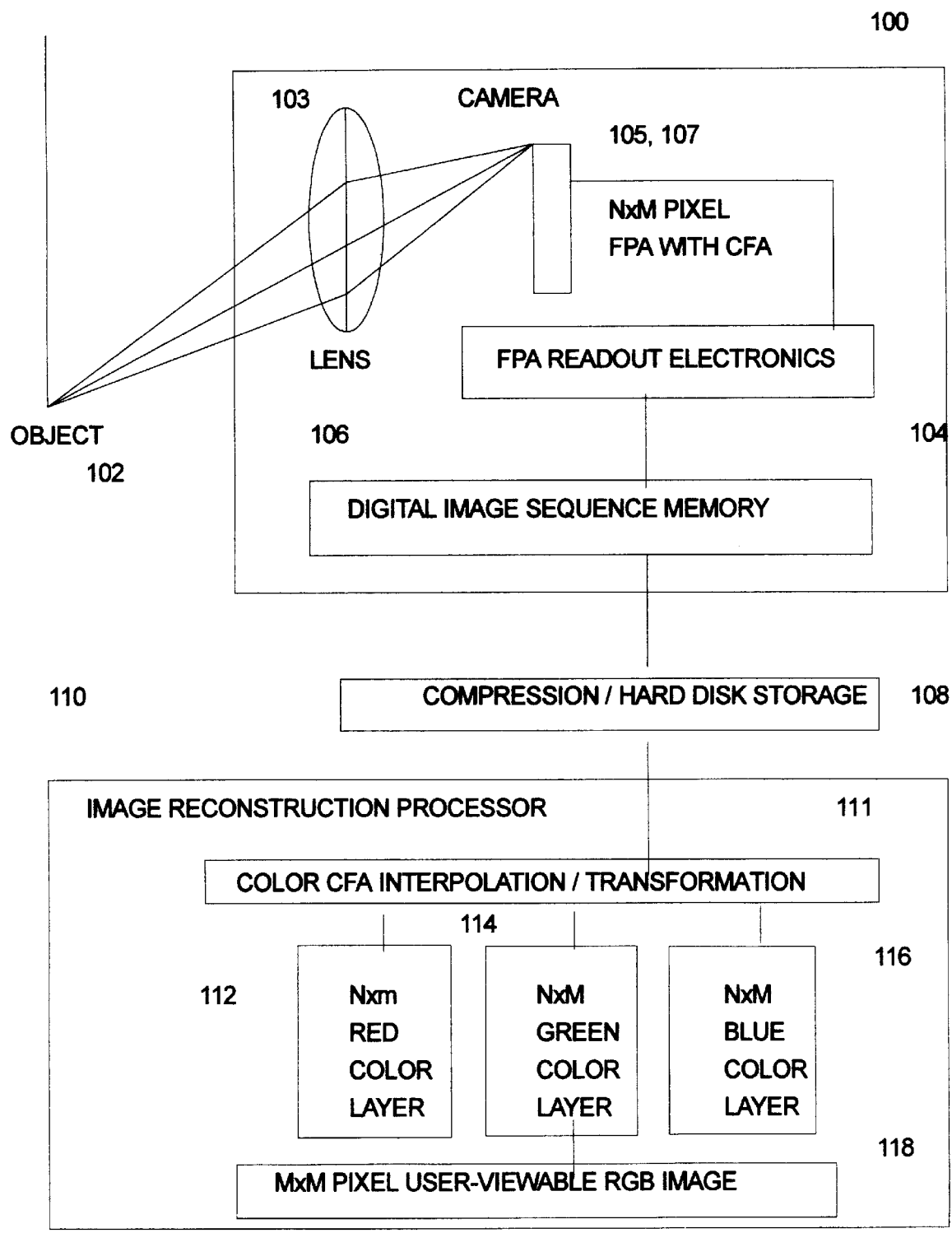
FIG. 1 is a schematic block diagram depicting an FPA-based digital camera and image processing system in accordance with the invention.

FIG. 1 is a block diagram depicting a FPA-based digital camera and image processing system 100 constructed in accordance with the invention, including a camera 102 having lens 103 and an N×M pixel, 2-D FPA 105 equipped with a subtractive color filter array (CFA) 107 (discussed in further detail below), FPA readout electronics 104 and camera-based digital image memory 106. The camera portion of the invention may also include a magnetic disk storage module 108, which may in turn include elements for executing conventional forms of image data compression, such as Joint Photographic Experts Group (JPEG) lossless compression. The embodiment shown in the drawing figures and described herein can be utilized for capturing high speed motion events for subsequent analysis. The digital image signal processing module 110 executes the image processing techniques of the invention, described more fully hereinafter, to provide color image processing in the FPA-based digital video system 100. The digital signal processing module 110 may include special-purpose digital signal processing elements to process the sampled pixel values to recreate the sampled image, including interpolation and color transformation circuity 111. As shown in FIG. 1, these elements transform the pixel values sampled by the FPA 105 and subtractive color filter array 107 into complete N×M red, green and blue color planes (112, 114, 116), which can be combined to provide an N×M pixel user-viewable RGB image 118. These elements are discussed in detail hereinafter.

The digital components utilized to construct the image processing apparatus of the invention thus may be divided into two major groups: (i) image acquisition components, including CFA-equipped FPA video camera 102 (with onboard volatile memory 106 and disk storage/compression elements 108 if required), and (ii) digital image processing components, including digital signal processing module 110 and its associated processing elements, which may employ conventional DSP architecture.

Depending upon the application, the camera 102 and the digital image processing components 100 may be in close proximity, with the processing occurring in real-time; or the camera and the image processing components may be separated by thousands of miles, with the data either transmitted by a telemetry channel for real-time processing, or stored for subsequent retrieval and processing. It is noted that previewing is not possible with conventional film-based testing, which requires time-consuming wet chemical film processing, handling and digitization.

In one practice of the invention, the digital signal processing module 110 may take the form of a general purpose computer running a software program. Each camera image is loaded into the computer memory, and the processing steps in module 110 are performed by the computer's microprocessor. The processed images are stored on a hard disk or equivalent storage device for subsequent viewing after processing is complete.

Some applications require processing and display of CFA image sequences at 20 to 30 frames per second. These computational speed requirements can exceed the capabilities of many general purpose computers. However, special-purpose hardware can be produced to perform the calculations at the desired speed. This specialized hardware can be implemented on a single circuit board utilizing floating point gate arrays (FPGAs) (available from Hitachi, Altera and others), application-specific integrated circuits (ASICS), fast memory, and other components. This card can be installed within a general purpose computer or utilized as a stand-alone unit.

CFA-Equipped FPA

Figures 2A, 2B:
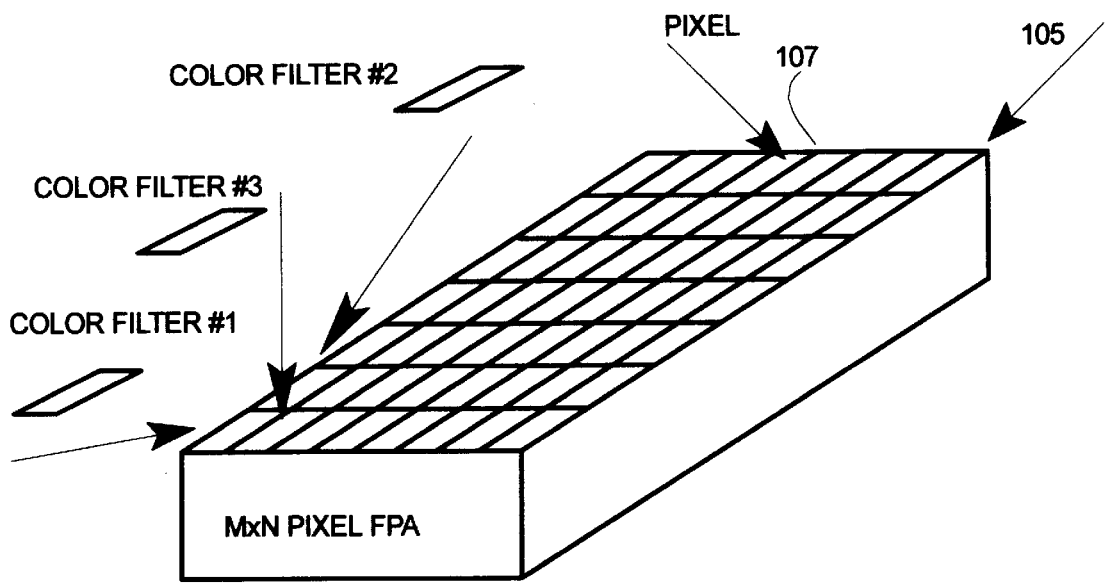
FIG. 2A is a schematic diagram depicting an embodiment of a CFA/FPA array constructed in accordance with the invention.
FIG. 2B is a schematic diagram depicting a top view of an M×N pixel CFA.

CFAs: In accordance with the invention, as noted above, the FPA-based camera 102 includes an FPA 105 equipped with a color filter array (CFA) 107. FIGS. 2A and 2B illustrate the structure and implementation of a color filter array (CFA) 107 for use with camera 102. Using conventional microlithographic masking techniques, a single, dyed polyimide color filter layer is deposited onto each pixel of a conventional FPA "chip." In one practice of the invention (FIG. 2B), each color filter element of the array is selected from a palette of 3 different colors ($CF_1$, $CF_2$, $CF_3$), to form a predefined "mosaic" pattern. Upon completion of this process, each pixel is covered with one of three different color filters.

The pixel count of the resulting CFA mosaic is identical to that of the underlying monochrome FPA. As a consequence, the CFA can be deposited onto the surface of a conventional monochrome FPA without affecting the design of the FPA camera or the image storage system. Moreover, the color camera memory and hard disk storage requirements will be substantially identical to that of a monochrome FPA. However, before the user can view the images in color, digital signal processing steps including interpolation and "decoding" must be performed, to recreate the three full resolution color planes from the original scene. These will be more fully described hereinafter.

Subtractive CFA: CFAs can be divided into two general categories: conventional additive CFAs; and subtractive CFAs which are utilized in the present invention. Additive CFAs utilize red, green and blue (RGB) primary colors. Hues are reproduced by the addition of these primary colors, hence the name "additive" colors. Subtractive colors are based on colors that absorb (or "subtract") one of the primary colors. For example, referring to the graphs set forth in FIGS. 3A and 3B, a cyan filter exhibits an absorption peak in the red portion of the spectrum, thereby removing (or subtracting) red light from the incident radiation. Similarly, yellow light is characterized by an absence of blue light, and magenta exhibits an absence of green light. Various subtractive color filters can be used in combination with clear filters (no filter present) to sense the primary colors represented in a scene.

Figure 3:
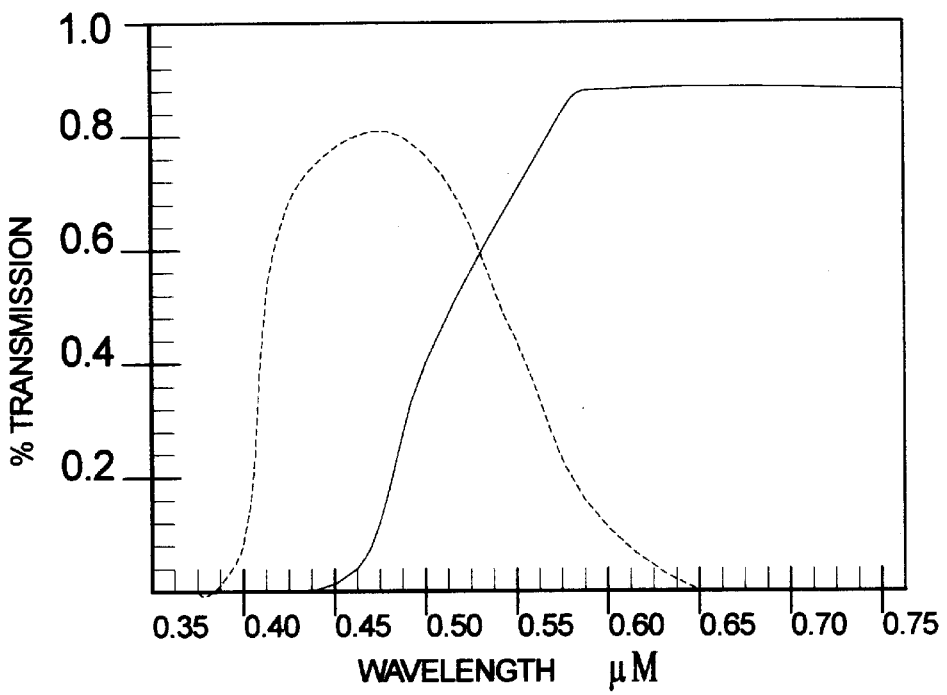
FIGS. 3A and 3B show graphs depicting transmission efficiency vs. wavelength for (a) subtractive (CYW) color filters, and (b) additive (RGB) color filters, demonstrating the transmissivity advantage of CYW filters.
Figure 3:
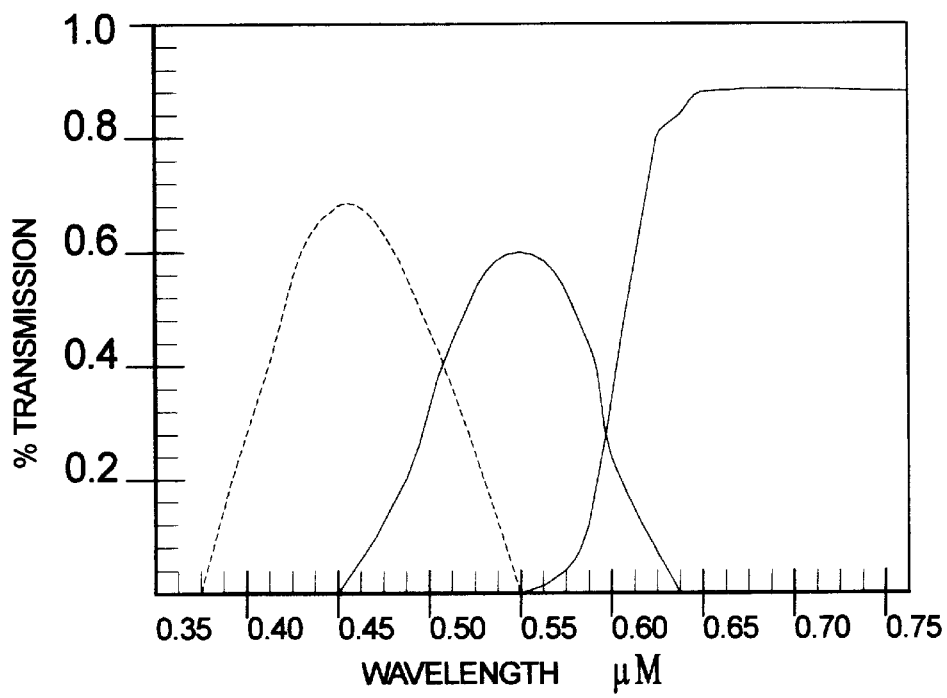
Figure 3A:
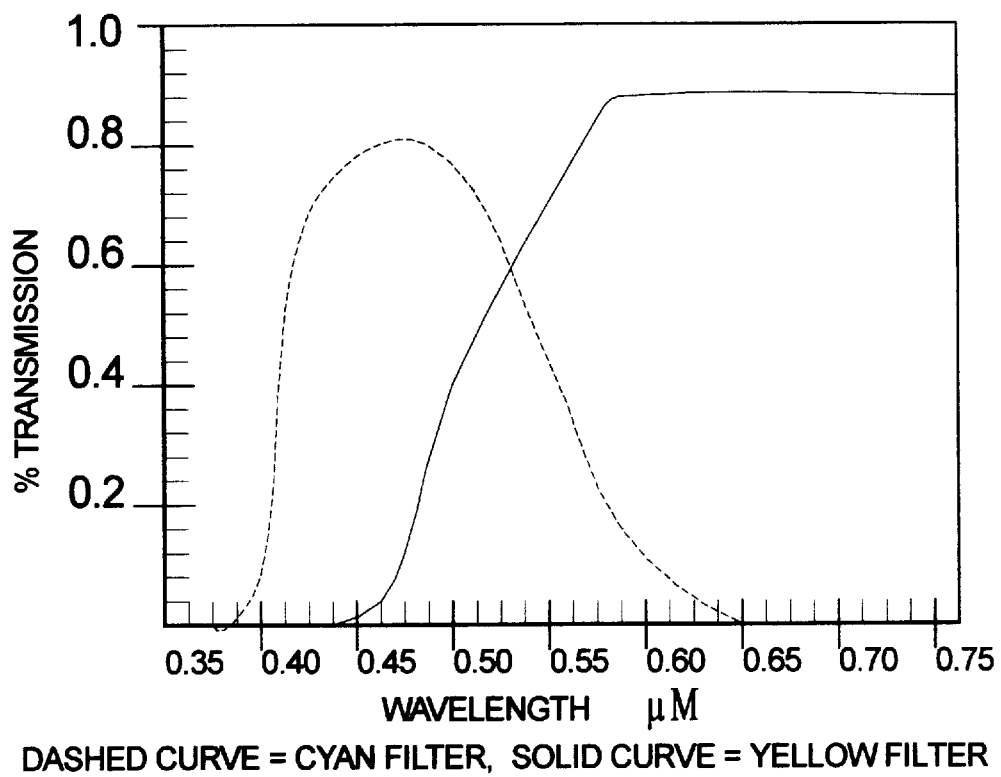
Figure 3B:
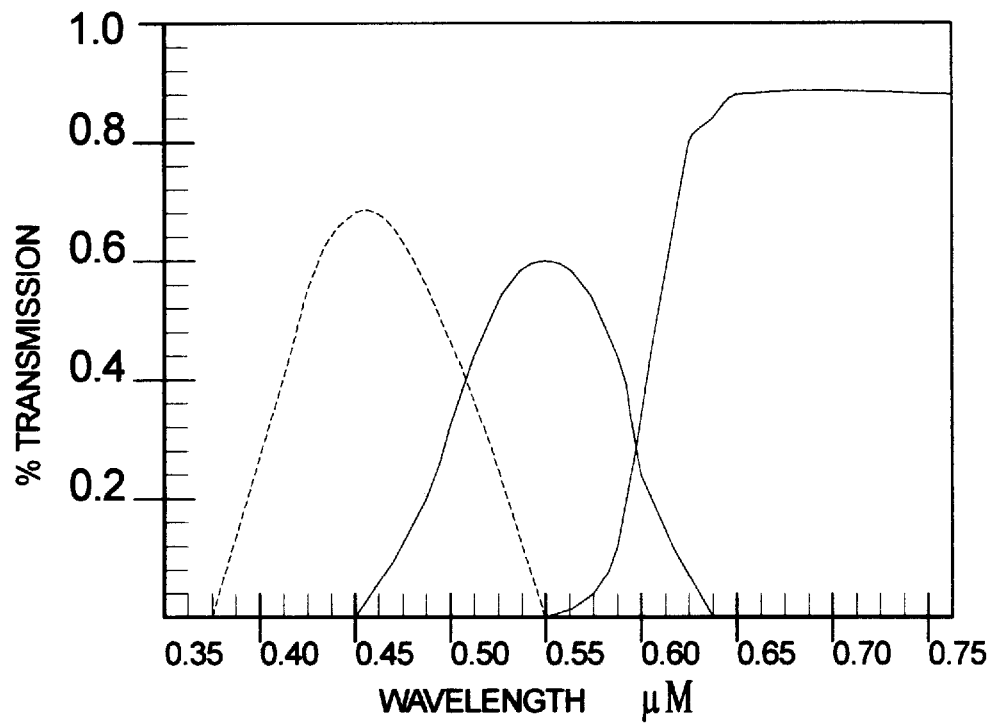

As can be seen from FIGS. 3A and 3B, subtractive filters such as cyan, yellow and white transmit a higher percentage of incident radiation than additive color filters such as red, green and blue. Therefore, a camera based on subtractive filters, in accordance with the invention described herein, achieves a better signal/noise ratio than a camera based on additive color filters. Signal/noise ratio is especially important for high speed cameras, since the exposure times must be short (~100 $\mu$sec) and operation may be required under moderately low lighting levels, such as during overcast or hazy weather, or when imaging shaded scenes.

Images obtained from conventional additive color FPAs are considerably noisier than those obtained from subtractive color FPAs constructed in accordance with the invention. The signal/noise ratio of additive color FPAs is significantly worse than that of subtractive color FPAS. Noise sources include quantum mechanical shot noise, thermal noise, and read noise in the FPA. The noise component masks the high frequency spatial detail that is present in the original image, and reduces the visibility of low and high contrast targets. Therefore, high speed cameras should utilize subtractive color filters to minimize the loss of signal with respect to noise.

CYW CFA: A subtractive cyan, yellow and white CFA solves these problems of conventional RGB CFA/FPA devices. FIG. 4A is a schematic diagram depicting an embodiment of a CFA 107a constructed in accordance with the invention, which exploits the above-noted transmissivity advantages of subtractive filtering. The invention utilizes a subtractive CFA consisting of an N×M-pixel matrix of filter elements—such as cyan, yellow, and white (CYW)—placed on or in front of an FPA array. The invention interpolates, filters and otherwise processes the values sampled from each pixel position of the CFA-equipped FPA to ultimately generate red, green, and blue (RGB) color planes which can be fed to a color CRT or color printer to produce a human-viewable color image.

As shown in FIG. 4A, a preferred CFA 107a is composed of 50% white (or clear or "no filter") pixels, 25% cyan pixels, and 25% yellow pixels. For example, a preferred CFA utilizes a 2×2 pixel matrix that is repeated across the entire FPA—2 diagonally-opposed pixels with no filters ("white"), and 2 diagonally-opposed pixels with color filters (cyan and yellow). An example of dyes that may be used in the photolithographic deposition of the dyed polyamide layers onto the CCD are Brewer Science Yellow 02 and Brewer Science Cyan.

Figure 4B:
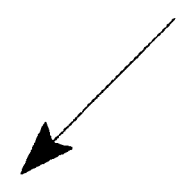
FIG. 4B is a schematic of a MYW CFA composed of 50% white (W) pixels, 25% magenta (M) pixels, and 25% yellow (Y) pixels.
Figure 4C:
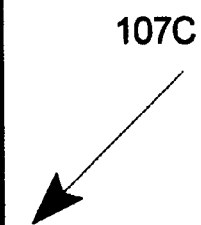
FIG. 4C is a schematic of a MCW CFA composed of 50% white (W) pixels, 25% magenta (M) pixels, and 25% cyan (C) pixels.

Other examples of subtractive filters that can be employed include magenta, yellow, white (MYW) and magenta, cyan, white (MCW), which are shown in FIGS. 4B and 4C, respectively. In the following discussion, these MYW and MCW CFAs are referred to by reference numerals 107b and 107c, respectively; while the subtractive CFAs disclosed herein are referred to collectively by reference numeral 107.

The use of 50% white, 25% cyan and 25% yellow provides significant advantages. Because half of the pixels do not have a filter and the other half utilize filters with relatively high transmission efficiency (cyan and yellow), the pattern yields a CFA/FPA configuration having overall sensitivity far superior to conventional RGB CFAs, and in fact similar to that of a monochrome FPA having no CFA.

The concomitant signal/noise ratio difference between additive (RGB) and subtractive (CYW) CFAs becomes evident upon analysis of filter efficiency of RGB filters versus CYW filters. For example, the transmission efficiencies of red, green, and blue filters used for conventional 3200° K. tungsten-halogen lamp illumination is 50%, 15% and 15%, respectively. The transmission efficiencies of cyan, yellow, and white (clear) filters are 28%, 70%, and 100% respectively. These values take into account the spectral characteristics of the illumination source, the filters, and the FPAs. Based upon application of these values, the effective transmission efficiency of the subtractive (CYW) CFA is 75% (when averaged over the repeating CFA pattern), while that of the additive (RGB) CFA is 25%. Therefore, those skilled in the art will appreciate that CYW CFAs provide a 3:1 average signal/noise ratio improvement over RGB CFAs.

Another advantage of the CYW CFA is that it requires only two instead of three process colors, thereby reducing mask and CFA production costs.

Further, this CFA can provide half-resolution black and white images very quickly, since half of the pixels do not have filters. This feature is especially useful for quickly previewing the data or sending data over a telemetry link.

Thus, the subtractive color process disclosed herein, utilizing cyan, yellow, and white (CYW) color filter elements, provides superior sensitivity, signal/noise ratio, and image quality. The next section teaches a method for efficiently converting the CYW image to a digital RGB image for viewing and analysis.

Decoding/Interpolation: Signal Processing Methods and Apparatus

Figure 5:
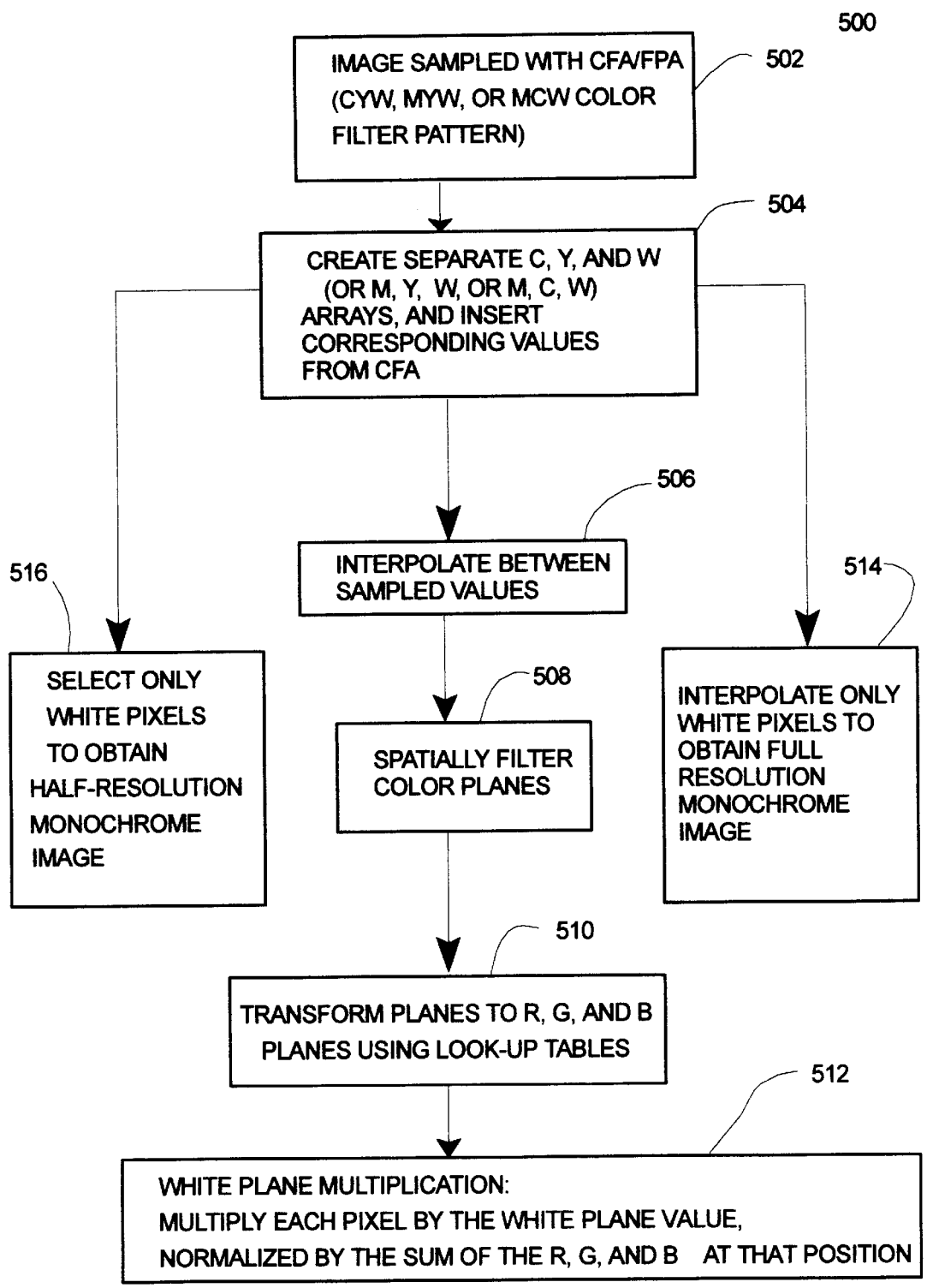
FIG. 5 is a flow chart showing the steps of a preferred practice of the invention, including the steps of sampling, interpolating, transforming to RGB, filtering, and white plane multiplication, as well as rapid generation of either half- or full-resolution monochrome (i.e., black and white) images from white pixel values.

Basic Method: FIG. 5 is a flow chart showing the steps of a preferred method 500 of the invention.

The first step (step 502) is sampling the image, using the CFA-equipped FPA (FIG. 1), to obtain a color value at each pixel position, thereby creating a set of values sampled on a per-pixel basis—i.e., a compressed dataset representing the color image. The set of pixel values thus sampled has, for each pixel position corresponding to the CFA/FPA, a single sampled value corresponding to the "color" sampled by the CFA/FPA at that pixel position. The data compression inherent in this method results from the fact that the set of sampled pixel values contains, for each pixel position, only one "color value," rather than three.

Next (step 504), the invention generates, from the set of sampled pixel values, single-color C, Y, and W color planes. This "generating" step is accomplished by simply selecting, from the memory locations into which the respective cyan, yellow and white pixel values are mapped, those values corresponding to each respective plane. The underlying methods of, and circuitry for, selecting digital values from particular locations in memory (such as from video RAM) are known in the digital signal processing art.

Next (step 506), the digital image signal processor 110 (FIG. 1) of the invention interpolates among and between the color planes to "fill in" the "gaps" in the individual color planes. It will be appreciated that these "gaps" exist because at each pixel position, the cyan/yellow/white color filter array allows only one subtractive "color" of light to pass through (white being referred to as a single subtractive "color" in this specification and in the patent claims appended hereto), such that the CFA/FPA combination collects only one "color value" at each pixel location. The compressed digital dataset generated by the CFA/FPA contains fewer pixel values than would be necessary to constitute complete cyan, yellow and white color planes representative of the sampled image. The interpolation process thus generates three "full" cyan, yellow and white color planes, collectively representing a "decompressed" dataset representative of the original color image.

Post-interpolation filtering (step 508), discussed in greater detail hereinafter, can be executed to reduce color aliasing.

In step 510, the digital image signal processor 110 (FIG. 1) executes a modified color transformation process to transform the interpolated CYW values from the single-color planes into RGB values which can be stored, transmitted, or utilized to drive a conventional video monitor or color printing device. The steps of filtering and transformation to RGB can be interchanged without loss of generality.

In a preferred practice of the invention, white plane multiplication (step 512) can be executed to introduce high frequency content back into the filtered color image. In addition, monochrome images can be rapidly generated with either full resolution (step 514) or half resolution (step 516). Moreover, conversion to CIELAB space can be utilized to attain further advantages (FIG. 7, discussed below). Each of these steps will next be examined in greater detail, with reference to FIGS. 6–8.

Sampling & Creating Planes: Processing of the digital color information obtained from the CFA-equipped FPA (105, 107) begins by (i) sampling the values generated at each pixel of the N×M pixel, CFA-equipped FPA to create a single "subtractive mosaic of interspersed white, cyan and yellow values (temporarily stored in the camera's digital memory 106); and (ii) subsequently creating, from those sampled values, three single-color N×M arrays corresponding to cyan, yellow, and white color planes, respectively (stored in color decoding system memory 161). The value sampled at each pixel position of the camera memory is copied to the same pixel position in the single-color array corresponding to the color of that pixel.

The image data can be transferred from camera digital memory 106 to the color decoding system memory 161 by several means. The data can be transferred directly via a high speed data link or a telemetry link. It can also be transferred by storing the data on an intermediate storage device, such as a disk drive or a tape drive.

In the context of the "hardware" utilized to implement the invention, the pixel values are first stored in individual addresses of a memory device, such as a conventional, high-speed RAM (106, 161). As required for further processing, the three single-color arrays are accessed by conventional circuitry which "selects" from the RAM the stored values for each of the respective cyan, yellow and white planes.

Interpolation: At this point in the process, each of the single-color arrays will have "gaps" at the pixel positions where the CFA-equipped FPA had no sensitivity to that color. These "gaps" are "filled in" by an interpolation processor 162. There are 2×N×M pixels that must be interpolated to recreate the full cyan, yellow, and white color planes from the single "subtractive mosaic" generated by the FPA.

In one practice of the invention, the interpolation processor 162 utilizes a weighted summation that incorporates the sampled value at the pixel as well as values of the pixels surrounding the pixel to be interpolated. In accordance with this practice of the invention, processor 162 utilizes and executes six interpolation formulas to determine, respectively, the values of W at the cyan position, W at the yellow position, Y at the cyan position, Y at the white position, C at the yellow position, and C at the white position. The equations are as follows:

W @ cyan position=0.7 (C[i,j])−0.175 (C[i−2,j]+C[i+2,j]+C[i,j+2]+C[i,j−2])+0.25 (W[i−1,j]+W[i+1,j]+W[i,j−1]+W[i,j+1])

W @ yellow position=0.7 (Y[i,j])−0.175 (Y[i−2,j]+Y[i+2,j]+Y[i,j+2]+Y[i,j−2])+0.25 (W[i−1,j]+W[i+1,j]+W[i,j−1]+W[i,j+1])

Y @ cyan position=C[i,j]−0.25 (C[i−2,j]+C[i+2,j]+C[i,j+2]+C[i,j−2])+0.25 (Y[i−1,j−1]+Y[i+1,j+1]+Y[i−1,j+1]+Y[i+1,j−1])

Y @ white position=0.5 (W[i,j])−0.125 (W[i−1,j−1]+W[i+1,j+1]+W[i+1,j−1]+W[i−1,j+1])+0.25 (Y[i−1,j]+Y[i+1,j]+Y[i,j+1]+Y[i,j−1])

Note: 2 of the yellow values are interpolated values from previous Y @ cyan calculation C @ yellow position=Y[i,j]−0.25 (Y[i−2,j]+Y[i+2,j]+Y[i,j+2]+Y[i,j−2])+0.25 (C[i−1,j−1]+C[i+1,j+1]+C[i−1,j+1]+C[i+1,j−1])

C @ white position=0.5 (W[i,j])−0.125 (W[i−1,j−1]+W[i+1,j+1]+W[i+1,j−1]+W[i−1,j+1])+0.25 (C[i−1,j]+C[i+1,j]+C[i,j+1]+C[i,j−1])

Note: 2 of the cyan values are interpolated values from previous C @ yellow calculation W=white, C=cyan, Y=yellow Post-interpolation Filtering: Significant color aliasing is produced if the C, Y, W color planes are directly transformed to RGB color space. Accordingly, as shown in the functional block diagram of FIG. 6, a preferred practice of the invention utilizes a filtering processor 163 and other post-interpolation steps to reduce color aliasing. The RGB color values at each pixel are then obtained (LUT 164) from these filtered color planes.

In particular, the interpolated C,Y,W color planes are filtered before the color is estimated, to reduce the spatial bandwidth of these planes. A 3×3 pixel square window with weighting coefficients can be employed. A particular filter employed in the invention is a simple 2-D window represented by the following equation:

$$X_{ij}=0.08\ (X_{i-1,j-1}+X_{i-1,j+1}+X_{i+1,j-1}+X_{i+1,j+1})+0.12(X_{i-1,j}+X_{i+1,j}+X_{i,j-1}+X_{i,j+1})+0.2\ X_{ij}$$

where X is C, Y, or W, depending on the color plane that is being filtered. Other 2-D low-pass filters can be used.

Again referring to FIG. 6, after the C, Y, and W planes are filtered, a color look-up table (LUT) 164 is used to determine the corresponding red, green, and blue values at each pixel location. A LUT consists of an addressable memory. The input values (such as C/W and Y/W) define an address, and the value at the corresponding memory location defines the output value of the LUT for the corresponding pair of input values. A LUT is a fast and efficient method for mapping input values to output values because no computations are required during the look-up process. All of the computations (and interpolations where necessary) are performed during the creation of the LUT.

Further reduction of aliasing: The subtractive color processes described herein produce color aliasing effects comparable to those produced by conventional additive color decoding processes. As with conventional additive processing, false colors or color aliasing can be produced by the noted color decoding process in areas of the image that exhibit high spatial frequencies. In addition to the filtering steps disclosed above, color aliasing can be further controlled by a number of different conventional methods. A blur filter can be introduced in front of or behind the lens to slightly reduce the effective resolution of the lens, thus reducing the spatial frequency content of the image. Slight defocus of the lens can also reduce color aliasing. The resolution of the scene can also be modified by changing the magnification or focal length of the lens, thus reducing high spatial frequency content for some targets. Finally, color aliasing can be reduced by utilizing a sensor with a higher pixel count. A 1K×1K pixel FPA will exhibit less color aliasing than a 512×512 FPA for equivalent fields of view, since it samples the scene at twice the spatial frequency.

White Plane Multiplication: If no processing steps other than those described above were performed, the resulting image would be a blurry (no high-frequency spatial content) version of the original image, albeit with minimal color aliasing. In many instances, however, high-frequency content is significant. Accordingly, in a further practice of the invention, since the white plane is an accurate representation of a monochrome luminance image, the white plane is used to introduce high frequency content back into the filtered color image.

Figure 6:
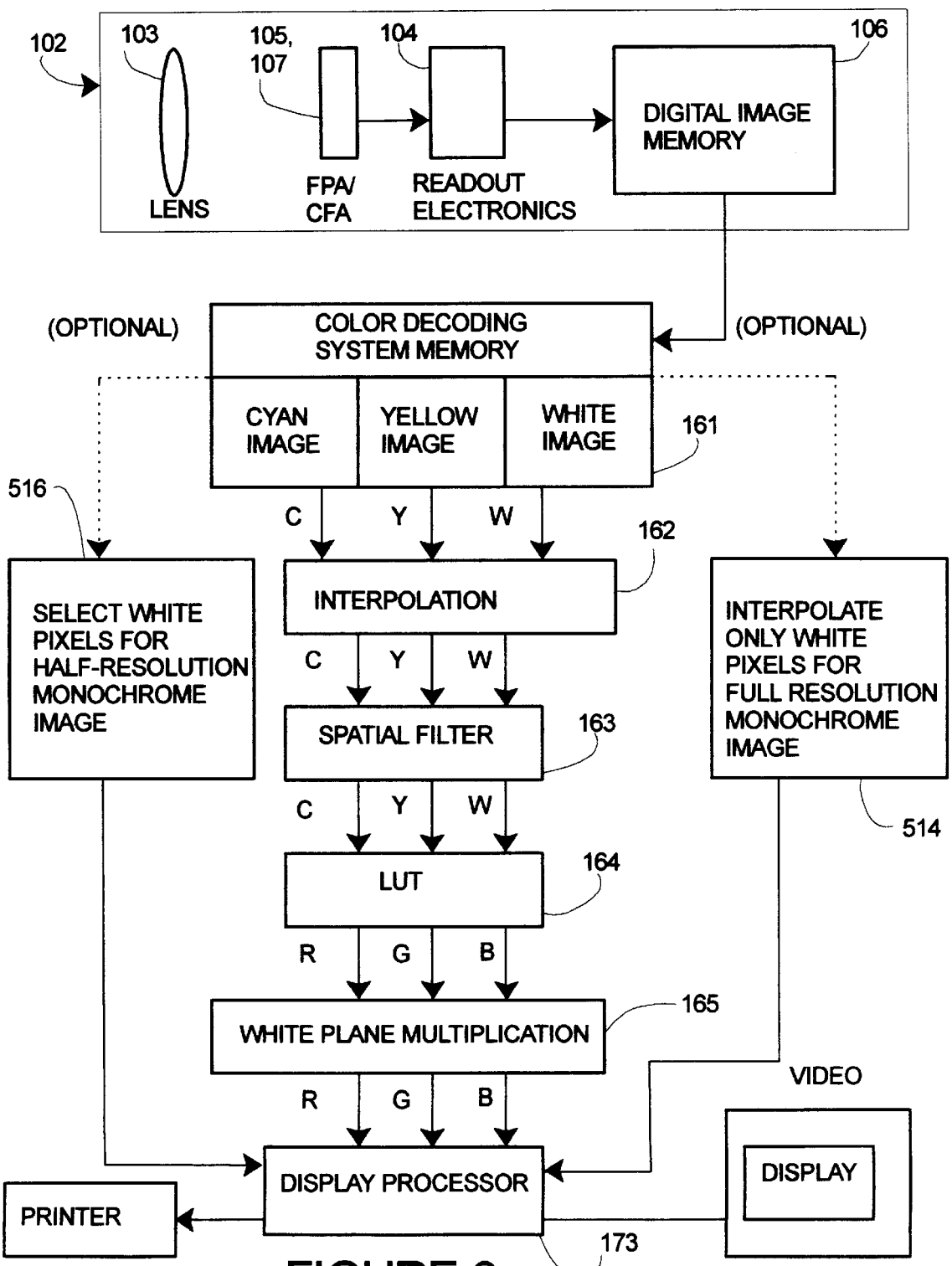
FIG. 6 is a functional block diagram of an image acquisition and processing system in accordance with one practice of the invention.
Figure 7:
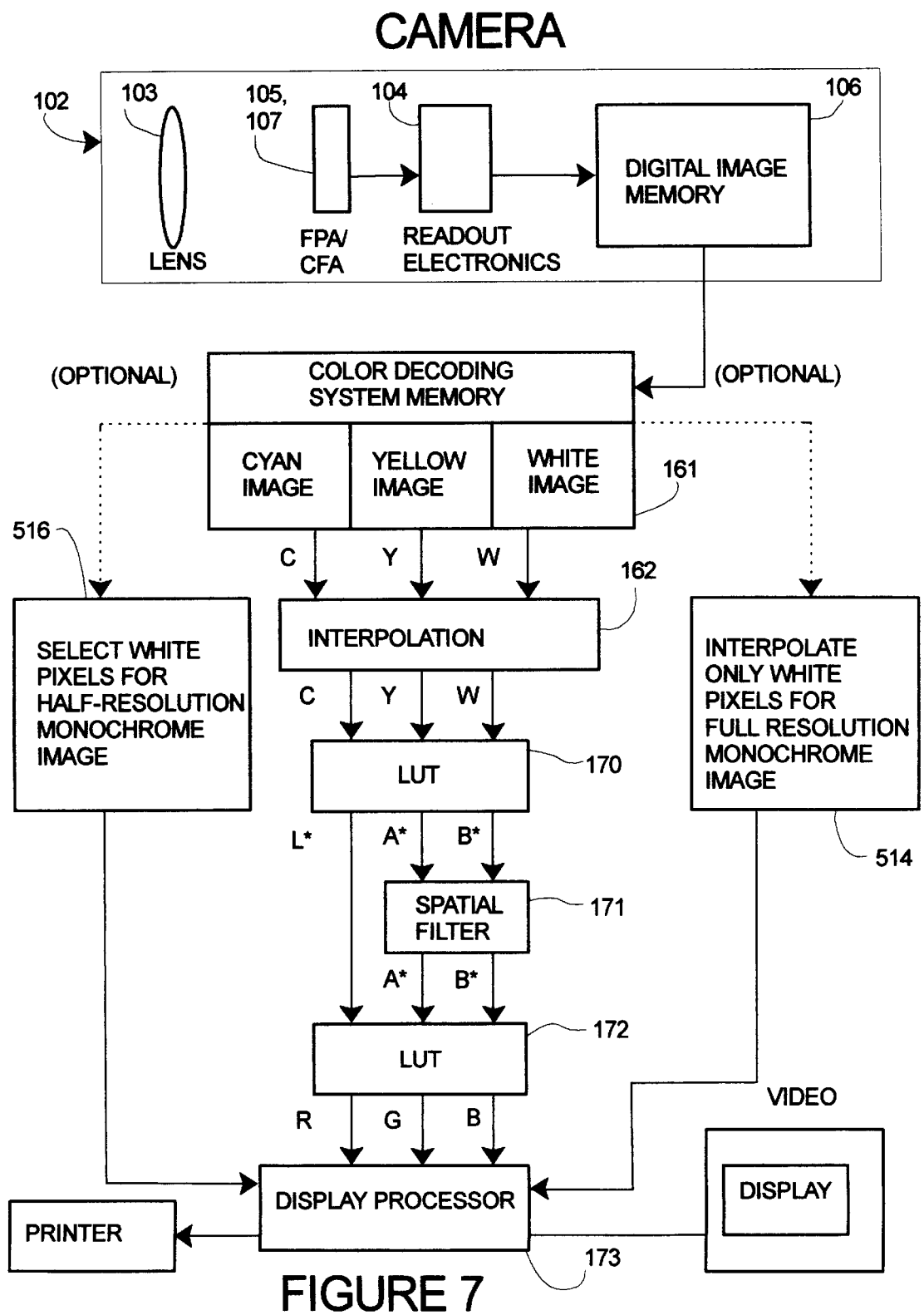
FIG. 7 is a functional block diagram of an image acquisition and processing system in accordance with another practice of the invention, including elements for executing sampling, interpolating, transforming to CIELAB color space, filtering, and transforming to RGB color space for display on a video display monitor.

With reference to the functional block diagram of FIG. 6, this is accomplished in white plane multiplication processor 165 by multiplying each pixel in the fully-generated red, green and blue planes by the white plane value, normalized by the sum of the red, green and blue values at that pixel position. A weighted sum of red, green, and blue values could also be used to better approximate the normalizing monochrome value, but at the cost of some additional MULTIPLY operations. The luminance at each pixel is adjusted so that it is equal to that of the white plane value at that location. This feature exploits the fact that the white plane provides a good replica of an actual monochrome image. By forcing the luminance of the predicted color to match that of the white channel in the present invention, no color artifacts are introduced by this final "white plane multiplication" step.

The utility of this step is based upon the fact that half the pixels (i.e., the white pixels) in the original matrix are luminance-sensing pixels, and the other half are only partially filtered. Consequently, the interpolated white plane produces a reasonably accurate replica of the actual monochrome scene, and can be used as a reliable estimate of the true luminance.

This process is superior to adding the high frequency green plane into the red, green, and blue channels, as taught in some prior art patents that use RGB color filters (such as U.S. Pat. No. 4,176,373). The invention thus exploits the fact that the "white" pixels—i.e., the pixels with no filters—sense broadband radiation over the entire visible spectrum, and therefore provide broadband luminance information. Although prior art additive systems have suggested or attempted the use of green filters to approximate luminance, such narrowband filters dramatically reduce the color and monochrome sensitivity and signal/noise ratio performance of the FPA.

As noted above, sensitivity is an important parameter for high speed digital imaging cameras because the exposure integration times must be short (<1 ms) to prevent scene motion blur. Quantum noise ("shot noise") increases as the total integrated exposure energy is reduced. In an additive FPA system, the SNR of the additive color FPA could be increased by opening the aperture of the lens (i.e., decreasing the f-number). However, this introduces spherical aberration and thereby reduces the resolution performance of the lens. In addition, decreasing the f-stop decreases the depth-of-focus, which is unacceptable for many applications. Shutter exposure times can be increased to compensate for the lower sensitivity of additive color FPAs, but this can increase the image motion blur. Thus, the use of green pixels is problematic.

In addition, green simply does not provide an accurate estimate of luminance. The final step in the process disclosed herein involves the use of luminance information (from the white pixels) to "impress" monochrome spatial detail onto the color scene. Green should not be used for that purpose, because it is color sensitive, and can therefore introduce color artifacts. A combination of red, green, and blue pixels could be used to simulate the luminance plane, but would require far more interpolated or estimated pixels than the white luminance plane technique described herein. The invention thus provides significant advantages in accurate luminance estimation and avoidance of color artifacts.

While the subtractive color mosaic decoding process of the invention introduces minimal artifacts, excessive noise in the image itself can introduce speckles and artifacts. These color speckles can be reduced by decreasing the color saturation of the image. If the color speckle at low illumination levels is unacceptable for a particular application, high quality monochrome images can still be produced if the subtractive mosaic processing of the invention is utilized. This is not the case for RGB-based CFA/FPAs.

Rapid Monochrome Imaging In a further practice of the invention, a full resolution monochrome image can be rapidly obtained from the subtractive mosaic by simply interpolating between the monochrome (i.e., white) pixels, thereby requiring only a fraction of the operations required to perform the full color decoding process. Since the full color decoding process follows the six equations set forth above, it will be appreciated that a full resolution monochrome image can be produced about six times more rapidly than the full color image—substantially eliminating the need for inventories of monochrome cameras. As noted above, the sensitivity and signal/noise ratio of this monochrome image will be comparable to that of the FPA without a CFA.

In a further practice of the invention, half-resolution monochrome images are very quickly produced by simply selecting the data corresponding to the monochrome (no filter) pixels. No interpolation or any other post-selection processing is required. The white" values sampled from the CCD thereby provide half-resolution black and white images at a speed greater than that possible with a conventional RGB CFA, since half of the pixels are already "white." This technique is useful for fast previews, or for transmitting data via radio or other low-bandwidth telemetry links.

Experimentation indicates that the subtractive CFA devices and processes disclosed herein produce black and white images comparable in quality to that of a monochrome (no CFA) camera. The invention is thus useful even in low-light conditions, in direct contrast to an additive color CCD camera, which performs poorly under low-illumination conditions. Thus, in accordance with the invention, if the environmental illumination drops below a value that is suitable for the desired level of color quality, either the color saturation can be reduced or a reasonably high quality monochrome image can be produced as noted. Since subtractive mosaic processing preserves monochrome performance in the subtractive color camera, inventories of monochrome cameras are not required, thereby reducing equipment and inventory costs.

Computational Requirements: To produce full resolution color images at video (~25 frame/s) frame rates, the subtractive color mosaic decoding process will require substantially the same computing resources as that required by additive color decoding processes. Experimentation indicates that the total number of mathematical operations required by the subtractive color decoding system for each image pixel are 40 ADD operations, 38 MULTIPLY operations, 4 SHIFTS, and 3 DIVIDES—i.e., approximately 80 arithmetic operations per pixel.

If the noted operations are performed sequentially on a 512×512 pixel image, $22 \times 10^6$ operations must be performed on each frame. If the viewing rate is 25 frames/s, the hardware must perform $560 \times 10^6$ floating point operations/second.

Those skilled in the art will appreciate that if conventional DSP or ASIC processors are employed, MULTIPLY and ADD operations can be performed in parallel. In this case, the processor must perform $10 \times 10^6$ floating point operations per frame, or a total of $262 \times 10^6$ floating point operations/second for a 25 frame per second viewing rate. Based on these numbers, the employment of conventional multiple processor systems, in a manner known in the digital video processing field, will be useful in achieving high viewing rates. The employment of conventional memory management circuitry, which is also well known in the digital video data processing field (particularly in the area of video RAM technology), will be useful to rapidly move image sequences in and out of the processing hardware. These processing requirements are analogous to those required by additive color processing.

Other Variations: Other coefficient values in the interpolation equations set forth above can be employed without substantially modifying the process described herein. In addition, methods for reducing "outliers" prior to filtering could be used to further reduce color aliasing artifacts. Color gamut limitations can also be applied to still further reduce color aliasing at the expense of color saturation.

In addition, the invention can utilize other color spaces. For example, in the embodiment shown in FIG. 7, values from the CYW (or other subtractive) color space are transformed to the known CIELAB color space, a device-independent color space frequently used in the graphic arts industry. This color space can be measured with a spectrophotometer, thus enabling accurate color calibration. The CYW color space can be mapped to CIELAB color space by utilizing the following color transformations:

$L=f_1(W)$, $a^*=f_2(C/W, Y/W)$ or $f_2(C,Y,W)$, $b^*=f_3(C/W, Y/W)$ or $f_3(C,Y,W)$, where $f_1$, $f_2$, and $f_3$ are functions which can be implemented with look-up tables (LUTs).

As shown in FIG. 7, the elements which execute the steps of CYW CFA image readout, storage, interpolation are the same as those described above. LUTs 170 are used to convert the interpolated CYW color planes to CIELAB color space. By using CIELAB color space, the luminance information is separated from the color information, thereby enabling independent processing of color and luminance. The a* and b* values represent the color of the pixel. The a* and b* values are spatially filtered in module 171 to reduce the color bandwidth and thus the color aliasing. Since CIELAB color space is a perceptually uniform color space, the filter operation in 171 will produce more uniform color transitions at the edges of objects in the image. Although 8 bits are typically used to represent a* and b*, experimentation has shown that this number can be reduced to 6 bits without unacceptable loss of color quality. Another advantage to using CIELAB color space is that the color gamut or saturation can be limited to reduce color aliasing or color noise, by simply setting limits on the a* and b* values.

The luminance or lightness planes values can either be passed directly to the next LUT, or they can be filtered for edge enhancement. This step is equivalent to the white plane multiplication step described for the CYW to RGB process (165). The CIELAB values are converted to RGB (LUT 173) for display. It is readily apparent that this process requires fewer filtering computations since only the a* and b* values must be filtered, thus saving computational time.

The values for the LUTs are determined by the following process. A calibrated color target is imaged with an FPA camera having a CYW CFA. The CIE L, a*, and b* values for the color patches in the target are known prior to image capture, and the corresponding C, Y, and W values are measured. Assuming $f_2$ and $f_3$ are multiple order polynomial functions of C/W and Y/W, a set of equations can be defined. These equations can be solved to obtain $f_2$ and $f_3$, which represent an interpolated mapping of C/W and Y/W to the a*, b* space. Functions $f_2$ and $f_3$ are then used to calculate the values for the LUTs. The function $f_1$ can be a linear function, or it can be a nonlinear curve for improved contrast.

In a particular practice of the invention, the values of color LUT 170 are determined by performing the following calibration procedure. A MacBeth ColorChecker Chart or other target with known CIELAB color values is photographed with the camera. The average cyan, yellow, and white value are obtained from the image data, and a linear or higher order mapping from CYW to LAB color space is calculated using the well-known least squares fit procedure. This mapping can be stored in the LUT for all possible cyan, yellow, and white values to accelerate the transformation process.

Different lighting sources (e.g. tungsten halogen, fluorescent, or daylight) can change the white balance of the process. The proper white balance can be achieved by pre-correction or post-correction means. Pre-correction for white balance can be accomplished by capturing an image under the desired lighting conditions, measuring the average a* and b* values of a diffuse white target, and then subtracting these offset values from all of the a* and b* values produced by LUT 170. This subtraction process can be incorporated into spatial filter module 171. Post-correction can be achieved by measuring the a* and b* values in an image that is known to be white, and subtracting this offset as described above.

The values for color LUT 172 can be calculated using the defining equations for the CIE LAB color space coordinates (see Hunt, R. W. G., *Measuring Colour*, Ellis Horwood Limited, 1995). This transformation will depend on the phosphors or filters used in the RGB display device, as well as the non-linear response ("gamma") of this device.

The known technique of gamma correction is used to correct for the fact that in conventional video display monitors, the relationship between phosphor response and electron gun current is non-linear, while the camera response is linear. By way of example, a conventional NTSC television system has a gamma of 2.2. In the present invention, gamma correction can be implemented as part of the display process, such as by utilizing a LUT in display processor 173 (FIGS. 6 and 7).

A further technique, pre-interpolation linearization, can be used to correct for saturation or "roll-off" response in the camera's sensor. In most cameras, as illumination is increased, sensor response is linear until the point where "roll-off" or saturation occurs. In a CYW CFA/FPA camera, as illumination is increased, the white areas will reach saturation first, while the yellow and cyan areas will continue to increase in response. The result: bright lime green output. This problem can be corrected by pre-interpolation linearization, which is implemented by utilizing a LUT before the interpolator, wherein the LUT contains values which are pre-calculated to correct for saturation. While this technique will not be necessary for all gain settings, it will be necessary when the system is at a "full well" setting.

Figure 8:
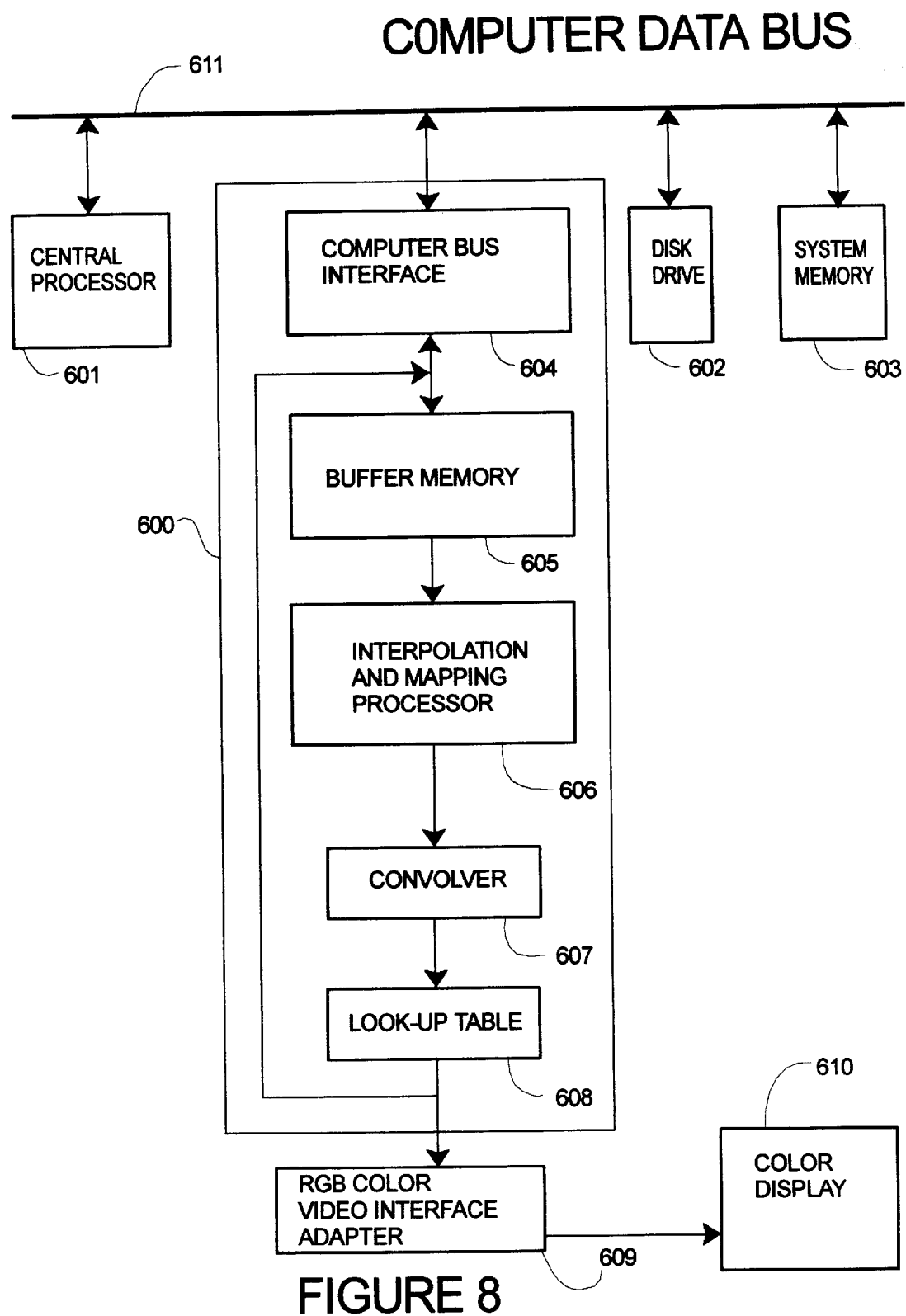
FIG. 8 is a block diagram of a microprocessor-based image processing system constructed in accordance with the invention.

FIG. 8 is a block diagram of a microprocessor-based embodiment of the invention. The diagram shows a computer with a central processing unit (CPU) 601, in communication with disk drive 602 and system memory 603 across a data and address bus 611. Common examples of such general purpose computer systems include Intel Pentium-based computers with Microsoft Windows operating systems, such as those available from Dell Computer Corporation and others. The color decoding process described herein can be performed by a software program (written, for example, in C) that reads the image data from the hard disk 602, stores it in memory 603, and performs the necessary calculations using the CPU 601. The results are transferred from 603 back to 602.

The process described above can be time-consuming if the number of images is large. It also precludes immediate viewing of stored images at 25 frames/second. A color processing circuit card 600 may be used to accelerate the color decoding process. This card consists of a computer bus interface 604 which moves data on and off the computer bus. The card can be used to read CFA images from the hard drive, process them, and return the RGB images back to the disk drive. Alternatively, the color images may be written to an RGB color interface adapter 609, which provides user-viewable images on the color display device 610 at "real-time" rates of 25–30 frames/second.

The color processing circuit card 600 includes a buffer memory 605 for temporarily storing incoming CFA images from the bus interface 604 and temporarily storing RGB image results to be written back to the hard disk 602 through the bus interface 604. The buffer memory 605 can be DRAM or SRAM (commercially available from Hitachi and others). Data from the buffer memory is passed through the interpolation and mapping processor 606, which performs the mathematical interpolation operations, as well as the color transformation mapping. These operations can be executed in a Floating Point Gate Array (FPGA) device such as the commercially available Xilinx 4000 Series devices. The spatial filtering step is performed by a convolver 607, which can also be implemented using a FPGA. The final mapping to RGB color space is performed by a LUT (608) using fast DRAM.

It will thus be seen that the invention efficiently attains the objects set forth above, among those made apparent from the preceding description. In particular, the invention provides improved digital FPA color imaging apparatus and methods, which afford enhanced computational efficiency and speed while maintaining high chromatic and spatial reproduction quality.

The invention is useful for diagnostic high speed imaging applications, exploiting subtractive color filter arrays (CFAs) as an optimal technique for implementing color in a high speed FPA camera. The colorization process does not significantly degrade the quality obtainable from current monochrome cameras when reconstructing monochrome images from CYW images. Further, there is no significant loss in full color quality (including color aliasing, resolution, modulation transfer function, and data throughput rate) using the subtractive CYW process of the invention, rather than the conventional additive RGB process. The CYW process should be favored by FPA manufacturers, based upon greater ease of fabrication. Subtractive CFAs constructed and utilized in accordance with the invention provide better sensitivity and higher signal/noise ratios, minimal performance degradation compared to monochrome cameras, and simpler CFA fabrication.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A solid-state, digital color image capture and processing system for capturing a color image, generating a compressed set of digital values representative thereof, and reconstructing the image from the compressed set of digital values, the system comprising:

a multiple-pixel focal plane array (FPA) for sampling the image, said FPA having a set of pixels, each pixel being disposed along an image plane to sample a respective portion of the image, said FPA also having a color filter array disposed on said image plane, said color filter array having subtractive color filter elements of different predetermined colors, arranged such that at each pixel of the FPA, the FPA samples a digital value corresponding to a respective one of the different predetermined colors, whereby the set of digital values sampled by the complete set of pixels of the FPA is a compressed digital dataset representative of the color image, said compressed digital dataset containing fewer values than necessary to constitute complete color planes for each of the different predetermined colors, the subtractive color filter elements being selected from the group consisting of any of (i) cyan, yellow and white, (ii) cyan, magenta and white, or (iii) yellow, magenta and white, a memory element in electrical communication with the FPA to store the digital values sampled by the FPA, the set of sampled digital values stored in the memory element being representative of the color image, and a digital image signal processing circuit adapted to receive the values stored in the memory element and to generate, from sampled digital values stored in the memory element, a decompressed set of values constituting a reconstructed digital representation of the sampled image, the subtractive color filter elements being arranged in a mosaic pattern consisting of 50% white pixels, 25% cyan pixels, and 25% yellow pixels, the digital image signal processing circuit comprising a circuit output at which the digital image signal processing circuit rapidly generates, from the sampled white values stored in the memory element, a half-resolution black and white image by selecting and transmitting only the sampled white values stored in the memory element.

2. A system according to claim 1, wherein the digital signal processing circuit further comprises a red/green/blue (RGB) transforming processor in electrical communication with the output of the interpolating circuit, for converting the values constituting full cyan, yellow and white color planes corresponding to the sampled image into red, green and blue values constituting full red, green and blue planes representative of the sampled image.

3. A system according to claim 2, wherein the RGB transforming processor comprises lookup tables which are addressable by the cyan, white and yellow values to generate red, green and blue values constituting full red, green and blue planes representative of the sampled image.

4. A system according to claim 3, wherein the digital image signal processing circuit further comprises a white plane multiplication circuit, adapted to (i) receive the red, green and blue values output by the lookup tables, (ii) multiply each such value in the fully-generated red, green and blue planes by the corresponding white plane value for each respective pixel, normalized by the sum of the red, green and blue values at that pixel position, and (iii) adjust the luminance at each pixel so that it is equal to the white plane value at that pixel position.

5. A system according to claim 4, wherein the digital signal processing circuit further comprises:

a spatial filtering circuit interposed between the interpolator and the RGB transforming processor, in electrical communication with an output of the interpolator circuit, for reducing the spatial bandwidth of the cyan, yellow and white planes prior to transformation into RGB planes.

6. A system according to claim 5, wherein the spatial filtering circuit comprises arithmetic logic circuitry to apply a two dimensional filtering window with selected weighting coefficients to the values of the respective cyan, yellow and white planes, thereby to reduce the spatial bandwidth of the cyan, yellow and white planes.

7. A system according to claim 4, wherein the digital signal processing circuit further comprises:

a spatial filtering circuit in electrical communication with an output of the RGB transforming processor, for reducing, following transformation into RGB planes, the spatial bandwidth of the RGB planes.

8. A system according to claim 1, wherein the memory element further comprises a non-volatile storage device to store the digital values sampled by the FPA.

9. A system according to claim 1, further comprising telemetry link circuitry, in electrical communication with the memory element and in telemetric communication with the digital signal processing circuit, for transmitting the digital values sampled by the FPA to the digital signal processing circuit via a telemetry link.

10. A solid-state, digital color image capture and processing system for capturing a color image, generating a compressed set of digital values representative thereof, and reconstructing the image from the compressed set of digital values, the system comprising:

a multiple-pixel focal plane array (FPA) for sampling the image, said FPA having a set of pixels, each pixel being disposed along an image plane to sample a respective portion of the image, said FPA also having a color filter array disposed on said image plane, said color filter array having subtractive color filter elements of different predetermined colors, arranged such that at each pixel of the FPA, the FPA samples a digital value corresponding to a respective one of the different predetermined colors, whereby the set of digital values sampled by the complete set of pixels of the FPA is a compressed digital dataset representative of the color image, said compressed digital dataset containing fewer values than necessary to constitute complete color planes for each of the different predetermined colors, the subtractive color filter elements being selected from the group consisting of any of (i) cyan, yellow and white, (ii) cyan, magenta and white, or (iii) yellow, magenta and white, a memory element in electrical communication with the FPA to store the digital values sampled by the FPA, the set of sampled digital values stored in the memory element being representative of the color image, a digital image signal processing circuit adapted to receive the values stored in the memory element, and to generate, from sampled digital values stored in the memory element, a decompressed set of values constituting a reconstructed digital representation of the sampled image, the digital signal processing circuit comprising:

a digital interpolating circuit which generates, from the sampled values stored in the memory element, a set of cyan, yellow and white values constituting complete cyan, yellow, and white color planes corresponding to the sampled image, the digital interpolating circuit comprising:

a circuit output at which the digital interpolating circuit rapidly generates, from the sampled white values stored in the memory element, a full resolution black and white image by interpolating only the sampled white values stored in the memory element.

11. A decoding circuit for generating a reconstructed color image from a compressed digital dataset representative of the color image, the compressed digital dataset being generated by a focal plane array (FPA) having a subtractive color filter array thereon, said color filter array having subtractive color filter elements of cyan, yellow and white, arranged such that at each pixel of the FPA, the FPA samples a digital cyan value, a digital yellow value, or a digital white value, whereby the set of digital cyan, yellow and white values sampled by the full set of pixels of the FPA is a compressed digital dataset representative of the color image, said compressed digital dataset containing fewer values than necessary to constitute complete cyan, yellow and white color planes representative of the sampled image, the decoding circuit comprising:

a digital image signal processor adapted to receive the values generated by the FPA and to generate, from sampled digital values stored in a memory element, a set of values constituting a reconstructed digital representation of the sampled image, the digital image signal processor including:

a digital interpolating circuit which generates, from the sampled values stored in the memory element, values constituting a complete set of cyan, yellow and white color planes corresponding to the sampled image, and a circuit output at which the digital image signal processor rapidly generates, from the sampled white values stored in the memory element, a half-resolution black and white image by selecting and transmitting only the sampled white values stored in the memory element.

12. The circuit of claim 11, wherein the digital signal processor further comprises a red/green/blue (RGB) transforming processor in electrical communication with the output of the interpolating circuit, for converting the values constituting full cyan, yellow and white color planes corresponding to the sampled image into values constituting full red, green and blue planes representative of the sampled image.

13. The circuit of claim 12, wherein the RGB transforming processor comprises lookup tables which are addressable by ones of the cyan, white and yellow values to generate red, green and blue values constituting full red, green and blue planes representative of the sampled image.

14. The circuit of claim 13, wherein the digital image signal processor further comprises a white plane multiplication circuit, adapted to (i) receive the red, green and blue values output by the lookup tables, (ii) multiply each such value in the fully-generated red, green and blue planes by the corresponding white plane value for each respective pixel, normalized by a weighted sum of the red, green and blue values at that pixel position, and (iii) adjust the luminance at each pixel so that it is equal to the white plane value at that pixel position.

15. The circuit of claim 14, wherein the digital signal processor further comprises:

a spatial filtering circuit interposed between the interpolator and the RGB transforming processor, in electrical communication with an output of the interpolator circuit, for reducing the spatial bandwidth of the cyan, yellow and white planes prior to transformation into RGB planes.

16. The circuit of claim 15, wherein the spatial filtering circuit comprises arithmetic logic circuitry to apply a two dimensional filtering window with selected weighting coefficients to the values of the respective cyan, yellow and white planes, thereby to reduce the spatial bandwidth of the cyan, yellow and white planes.

17. The circuit of claim 14, wherein the digital signal processor further comprises:

a spatial filtering circuit in electrical communication with an output of the RGB transforming processor, for reducing, following transformation into RGB planes, the spatial bandwidth of the RGB planes.

18. A decoding circuit for generating a reconstructed color image from a compressed digital dataset representative of the color image, the compressed digital dataset being generated by a focal plane array (FPA) having a subtractive color filter array thereon, said color filter array having subtractive color filter elements of cyan, yellow and white, arranged such that at each pixel of the FPA, the FPA samples a digital cyan value, a digital yellow value, or a digital white value, whereby the set of digital cyan, yellow and white values sampled by the full set of pixels of the FPA is a compressed digital dataset representative of the color image, said compressed digital dataset containing fewer values than necessary to constitute complete cyan, yellow and white color planes representative of the sampled image, the decoding circuit comprising:

a digital image signal processor adapted to receive the values generated by the FPA and to generate, from sampled digital values stored in a memory element, a set of values constituting a reconstructed digital representation of the sampled image, the digital image signal processor including:
a digital interpolating circuit which generates, from the sampled values stored in the memory element, values constituting a complete set of cyan, yellow and white color planes corresponding to the sampled image, the digital interpolating circuit comprising:
a circuit output at which the interpolating circuit rapidly generates, from the sampled white values stored in the memory element, a full resolution black and white image by interpolating only the sampled white values stored in the memory element.

19. A method of capturing a color image, generating a compressed set of digital values representative thereof, and reconstructing the image from the compressed set of digital values, the method comprising the steps of:
providing a multiple-pixel focal plane array (FPA) for sampling the image, said FPA having a set of pixels, each pixel being disposed along an image plane to sample a respective portion of the image,
disposing a subtractive color filter array on an image plane of the FPA, said color filter array having subtractive color filter elements of different predetermined colors, the arrangement of subtractive color filter elements forming a subtractive filter mosaic in which subtractive color filter elements each overlie a respective pixel of the FPA,
configuring the subtractive color filter array to have subtractive color filter elements of cyan, yellow and white,
sampling the image with the multiple-pixel FPA upon which the subtractive color filter array is disposed, such that each pixel of the FPA samples a digital value corresponding to a respective one of the different predetermined colors, whereby the set of digital values sampled by the complete set of pixels of the FPA is a compressed digital dataset representative of the color image, said compressed digital dataset containing fewer values than necessary to constitute complete color planes for each of the different predetermined colors,
storing the digital values sampled by the FPA in a memory element, the set of sampled digital values stored in the memory element being representative of the color image, and
generating, from the sampled digital values stored in the memory element, a decompressed set of values constituting a reconstructed digital representation of the sampled image,
said generating step including the step of utilizing a digital signal processing circuit,
the step of configuring the subtractive color filter array to have subtractive color filter elements of cyan, yellow and white including the step of configuring the subtractive color filter array to have a mosaic pattern consisting of 50% white pixels, 25% cyan pixels, and 25% yellow pixels,
the step of generating a decompressed set of values constituting a reconstructed digital representation of the sampled image comprising the step of interpolating across the set of sampled cyan, yellow and white values stored in the memory element to generate a set of cyan, yellow and white values constituting complete cyan, yellow, and white color planes corresponding to the sampled image,
the step of interpolating comprising:
generating, from the sampled white values stored in the memory element, a full resolution black and white image, by interpolating only the sampled white values stored in the memory element.

20. The method of claim 19, comprising the further step of
converting the cyan, yellow and white values constituting complete cyan, yellow and white color planes corresponding to the sampled image into red, green and blue values constituting complete red, green and blue planes representative of the sampled image.

21. The method of claim 20, wherein the step of converting the cyan, yellow and white values constituting complete cyan, yellow and white color planes into red, green and blue values comprises
addressing a lookup table with ones of the cyan, white and yellow values to generate red, green and blue values constituting complete full red, green and blue planes representative of the sampled image.

22. The method of claim 21, wherein the step of generating a decompressed set of values constituting a reconstructed digital representation of the sampled image further comprises the steps of
multiplying each respective red, green and blue value in the fully-generated red, green and blue planes by the corresponding white plane value for each respective pixel, normalized by the sum of the red, green and blue values at that pixel position, and
adjusting the luminance at each pixel so that it is equal to the white plane value at that pixel position.

23. The method of claim 22, wherein the step of generating a decompressed set of values constituting a reconstructed digital representation of the sampled image comprises the further step of
filtering the cyan, yellow and white values contained in the cyan, yellow and white planes to reduce the spatial bandwidth of the cyan, yellow and white planes prior to transformation into RGB planes.

24. The method of claim 22, wherein the step of generating a decompressed set of values constituting a reconstructed digital representation of the sampled image comprises the further step of
filtering, following transformation into RGB planes, the red, green and blue values contained in the red, green and blue planes to reduce the spatial bandwidth thereof.

25. The method of claim 24, wherein the step of generating a decompressed set of values constituting a reconstructed digital representation of the sampled image comprises the further step of
generating, from the sampled white values stored in the memory element, a half-resolution black and white image, by selecting and transmitting only the sampled white values stored in the memory element.

26. The method of claim 19, wherein the step of storing values in a memory element further comprises the step of
utilizing a non-volatile storage device to store the digital values sampled by the FPA.

27. The method of claim 19, further comprising
utilizing a telemetry link to transmit the digital values sampled by the FPA to the digital signal processing circuit.

28. A method of generating a reconstructed color image from a compressed digital dataset representative of the color image, the compressed digital dataset being generated by a focal plane array (FPA) having a subtractive color filter array thereon, said color filter array having subtractive color filter elements of cyan, yellow and white, arranged such that at each pixel of the FPA, the FPA samples a digital cyan value, a digital yellow value, or a digital white value, whereby the set of digital cyan, yellow and white values sampled by the full set of pixels of the FPA is a compressed digital dataset representative of the color image, said compressed digital dataset containing fewer values than necessary to constitute complete cyan, yellow and white color planes representative of the sampled image, the method comprising the steps of:

generating, from digital values sampled by the FPA, a set of values constituting a reconstructed digital representation of the sampled image, the step of generating a set of values constituting a reconstructed digital representation of the sampled image including the step of interpolating across the digital cyan, yellow and white values sampled by the FPA to generate respective cyan, yellow and white values constituting complete cyan, yellow and white color planes corresponding to the sampled image, the step of generating a set of values constituting a reconstructed digital representation of the sampled image, and generating, from the sampled white values stored in the memory element, a half-resolution black and white image by selecting and transmitting only the sampled white values stored in the memory element.

29. The method of claim 28, wherein the step of generating a set of values constituting a reconstructed digital representation of the sampled image further comprises the step of converting the cyan, yellow and white values constituting complete cyan, yellow and white color planes corresponding to the sampled image into red, green and blue values constituting complete red, green and blue planes representative of the sampled image.

30. The method of claim 29, wherein the converting step comprises the further step of addressing lookup tables with ones of the cyan, white and yellow values, to generate red, green and blue values constituting full red, green and blue planes representative of the sampled image.

31. The method of claim 30, wherein the step of generating a set of values constituting a reconstructed digital representation of the sampled image further comprises the steps of multiplying each respective red, green and blue value in the fully-generated red, green and blue planes by the corresponding white plane value for each respective pixel, normalized by the sum of the red, green and blue values at that pixel position, and adjusting the luminance at each pixel so that it is equal to the white plane value at that pixel position.

32. The method of claim 31, wherein the step of generating a set of values constituting a reconstructed digital representation of the sampled image comprises the further step of reducing the spatial bandwidth of the cyan, yellow and white planes prior to transformation into RGB planes.

33. The method of claim 32, wherein the step of reducing the spatial bandwidth of the cyan, yellow and white planes includes the step of filtering the values of the respective cyan, yellow and white planes with a two dimensional filtering window with selected weighting coefficients, to reduce the spatial bandwidth of the cyan, yellow and white planes.

34. A method of generating a reconstructed color image from a compressed digital dataset representative of the color image, the compressed digital dataset being generated by a focal plane array (FPA) having a subtractive color filter array thereon, said color filter array having subtractive color filter elements of cyan, yellow and white, arranged such that at each pixel of the FPA, the FPA samples a digital cyan value, a digital yellow value, or a digital white value, whereby the set of digital cyan, yellow and white values sampled by the full set of pixels of the FPA is a compressed digital dataset representative of the color image, said compressed digital dataset containing fewer values than necessary to constitute complete cyan, yellow and white color planes representative of the sampled image, the method comprising the steps of:

generating, from digital values sampled by the FPA, a set of values constituting a reconstructed digital representation of the sampled image, the step of generating a set of values constituting a reconstructed digital representation of the sampled image including the step of interpolating across the digital cyan, yellow and white values sampled by the FPA to generate respective cyan, yellow and white values constituting complete cyan, yellow and white color planes corresponding to the sampled image, the interpolating step includes the further step of generating, from the sampled white values stored in the memory element, a full resolution black and white image, by interpolating only the sampled white values stored in the memory element.

\* \* \* \* \*

UNITED STATES PATENT AND TRADEMARK OFFICE
CERTIFICATE OF CORRECTION

| | | |
|---|---|---|
| PATENT NO. | : 6,366,319 B1 | Page 1 of 1 |
| APPLICATION NO. | : 09/579818 | |
| DATED | : April 2, 2002 | |
| INVENTOR(S) | : Richard Bills | |

It is certified that error appears in the above-identified patent and that said Letters Patent is hereby corrected as shown below:

<u>Column 1,</u>
Line 3, insert the following:
-- This invention was made with Government support under Department of the Navy Contract No. N00421-95-D-1067-0004. The Government has certain rights in the invention. --.

Signed and Sealed this

Twenty-seventh Day of June, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,366,319 B1 | Page 1 of 1 |
| APPLICATION NO. | : 08/888007 | |
| DATED | : April 2, 2002 | |
| INVENTOR(S) | : Richard Bills | |

It is certified that error appears in the above-identified patent and that said Letters Patent is hereby corrected as shown below:

Column 1,
Line 3, insert the following:
-- This invention was made with Government support under Department of the Navy Contract No. N00421-95-D-1067-0004. The Government has certain rights in the invention. --.

This certificate supersedes Certificate of Correction issued June 27, 2006.

Signed and Sealed this

Fourteenth Day of November, 2006

JON W. DUDAS
*Director of the United States Patent and Trademark Office*